United States Patent [19]
Heitmann et al.

[11] 3,979,288
[45] Sept. 7, 1976

[54] DOUBLE-FLOW MAGNETIC FILTER, APPARATUS AND METHOD

[75] Inventors: Hans-Günter Heitmann, Erlangen-Buckenhof; Manfred Schott, Erlangen, both of Germany

[73] Assignee: Kraftwerk Union Aktiengesellschaft, Mulheim, Germany

[22] Filed: Apr. 22, 1975

[21] Appl. No.: 570,414

Related U.S. Application Data

[63] Continuation of Ser. No. 460,166, April 11, 1974, abandoned.

[30] Foreign Application Priority Data
Apr. 13, 1973 Germany............................ 2318755

[52] U.S. Cl. ................................ 210/42 S; 210/222
[51] Int. Cl.² ............................................ B01D 35/06
[58] Field of Search ........... 210/220, 222, 223, 279, 210/42; 209/223, 224

[56] References Cited
UNITED STATES PATENTS

| | | | |
|---|---|---|---|
| 471,811 | 3/1892 | Deutsch.............................. | 210/279 |
| 654,479 | 7/1900 | McNally ......................... | 210/279 X |
| 678,532 | 7/1901 | Bachman........................ | 210/279 X |
| 1,942,807 | 1/1934 | Dotterweich .................... | 210/279 X |
| 1,942,808 | 1/1934 | Dotterweich .................... | 210/279 X |
| 2,385,431 | 9/1945 | Vose................................ | 210/223 X |
| 3,539,509 | 11/1970 | Heitmann et al. ............... | 210/222 X |

FOREIGN PATENTS OR APPLICATIONS

| | | | |
|---|---|---|---|
| 6,716,237 | 5/1968 | Netherlands........................ | 210/222 |
| 1,204,324 | 11/1967 | United Kingdom.................. | 210/222 |

*Primary Examiner*—Theodore A. Granger
*Attorney, Agent, or Firm*—Herbert L. Lerner

[57] ABSTRACT

Electromagnetic filter apparatus and method for impure water including an elongated substantially vertically disposed vessel traversible by impure water that is to be purified, a charge of magnetizable ball-like pellets received in the vessel, electric coil means coaxially surrounding the vessel, the coil means being electrically energizable to produce a magnetic field, rinsing water supply means connected to the substantially vertically disposed vessel at the lower end thereof, rinsing water discharge means connected to the vessel at the upper end thereof, passage means having a multiplicity of openings distributed over the cross section of the vessel in a plane disposed transversely to the axis of the vessel at substantially the middle of the charge of ball-like pellets, a pair of water connector means, respectively, for supplying water to and discharging water from the vessel, means connecting the openings of the passage means to one of the water connector means, and respective lines extending from the ends of the vessel to the other of the water connector means, a shutoff valve being connected in one of the lines.

5 Claims, 1 Drawing Figure

U.S. Patent  Sept. 7, 1976  3,979,288
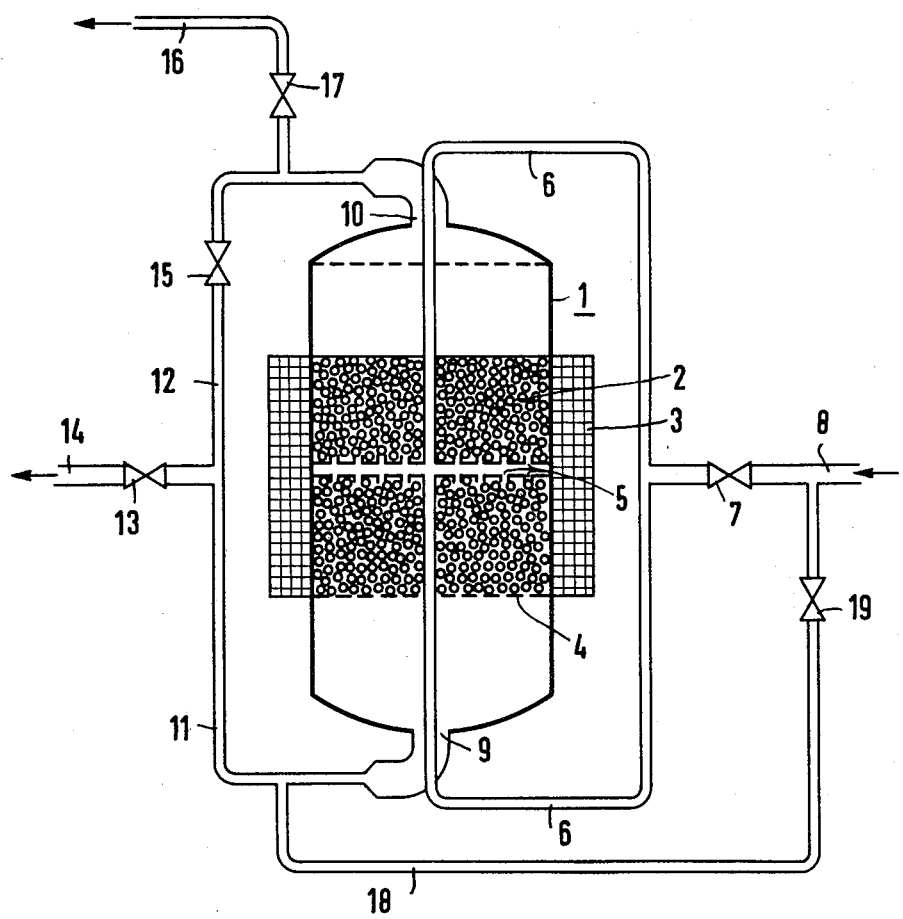

DOUBLE-FLOW MAGNETIC FILTER, APPARATUS AND METHOD

This is a continuation of application 460,166, filed Apr. 11, 1974, now abandoned.

The invention relates to magnetic filters and, more particularly to a double-flow magnetic filter.

From German Pat. Nos. 1 277 488 and 1 816 859, electromagnetic filters are known which are formed essentially of a cylindrical vessel that is charged with magnetizable balls. The cylindrical vessel is surrounded by a coil which is energized with continuous or direct current during filtering operation thereof and is demagnetized by alternating current before the filter is rinsed. The water flows through the cylindrical vessel of the aforementioned heretofore known electromagnetic filter from the bottom to the top thereof. The flow velocity of the water is adjusted during the rinsing so that the balls in the cylindrical vessel are whirled upwardly and the adherent matter is removed from the balls.

Such electromagnetic filters have been installed heretofore, for example, in steampower plants heated with fossil fuels and also in nuclear power plants, in order to remove ferromagnetic impurities from the feedwater.

Depending upon the quantity of feedwater to be purified in such a plant or system, either a large number of magnetic filters must be mutually connected in parallel or electromagnetic filters of relatively large diameter as compared to a relatively low structural height thereof must be built.

Corresponding to the dimensions of the filter, the coil for producing a magnetic field in a filter for relatively high flowthrough rates must be provided with a relatively large diameter for a relatively low coil height. An electromagnetic filter therefore has a greater share of stray magnetic flux for substantially the same structural height and double the diameter. This causes irregularities or non-uniformities in the magnetic field and very poor separation or deposition. Furthermore, the quantity of rinsing medium that must flow through the filter per unit time in order to permit the balls to whirl upwardly, is essentially determined by the filter diameter so that a considerable increase in the diameter of the filter requires corresponding measures for assuring an adequate rinsing medium supply.

It is according an object of the invention to provide an electromagnetic filter which permits greater flowthrough rates for relatively limited rinsing water demand without allowing nonuniformities or irregularities in the magnetic field and high stray magnetic fields to occur due to a disadvantageous dimension ratio of the coil diameter to the coil height.

With the foregoing and other objects in view, there is provided, in accordance with the invention, electromagnetic filter apparatus and method for impure water comprising an elongated substantially vertically disposed vessel traversible by impure water that is to be purified, a charge of magnetizable ball-like pellets received in the vessel, electric coil means coaxially surrounding the vessel, the coil means being electrically energizable to produce a magnetic field, rinsing water supply means connected to the substantially vertically disposed vessel at the lower end thereof, rinsing water discharge means connected to the vessel at the upper end thereof, passage means having a multiplicity of openings distributed over the cross section of the vessel in a plane disposed transversely to the axis of the vessel at substantially the middle of the charge of ball-like pellets, a pair of water connector means, respectively, for supplying water to and discharging water from the vessel, means connecting the openings of the passage means to one of the water connector means, and respective lines extending from the ends of the vessel to the other of the water connector means, a shut-off valve being connected in one of the lines.

In accordance with another feature of the invention, the one line wherein the shut-off valve is connected extends from the upper end of the vessel, the shut-off valve being located in the one line between the other water connector means and a location at which the rinsing water discharge means branches from the one line, and including a closable connecting line extending from the lower end of the vessel to the one water connector means.

In accordance with a further feature of the invention, the other water connector means that is connected by the respective lines to both ends of the vessel is connectible to a source of water to be supplied to the vessel, the one of the lines extending from the upper end of the vessel, the shut-off valve connected in the one of the lines being closable, when switching the electromagnetic filter from filter operation to rinsing operation, so that the other of the lines, connecting with the lower end of the vessel serves to conduct to the vessel rinsing medium suppliable through the other water connector means.

In accordance with yet another feature of the invention, the one water connector means serves to conduct water to the openings in the passage means located at substantially the middle of the charge of ball-like pellets, and including a screen floor located above the lower end of the vessel, the charge of ball-like pellets being carried by the screen floor.

Other features which are considered as characteristic for the invention are set forth in the appended claims.

Although the invention is illustrated and described herein as embodied in a double flow magnetic filter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing which is a schematic and diagrammatic view of a double-flow magnetic filter according to the invention.

Referring now to the drawing, there is shown therein an embodiment of the electromagnetic filter of the invention which is formed of a cylindrical vessel 1 wherein a charge of magnetizable balls or pellets 2 is received on a screen floor 4. In the region wherein the charge of magnetizable balls 2 is located, the vessel 1 is surrounded by an electromagnet coil 3. As seen in the FIGURE, the charge of magnetizable balls 2 extends up to a level considerably below the top of the vessel 1. Accordingly, a free space is provided within the vessel 1 both above and below the charge of magnetizable balls 2. In the middle of the charge of balls 2, within the cylindrical vessel 1, open passages 5 are formed over the cross section of the vessel 1 and are connected through tubes 6 and through an inlet valve 7 with a first water connector 8. In the illustrated embodiment of the invention, the water connector 8 serves for supplying impure water that is to be purified. The cylindrical vessel 1 is connected at the ends 9 and 10 thereof through lines 11 and 12, respectively, and an outlet valve 13 to a second water connector 14. A shut-off valve 15 is connected in the line 12 which branches from the upper end 10 of the cylindrical vessel 1, as viewed in the FIGURE. Furthermore, a rinsing medium discharge line 16 having a shut-off valve 17 connected therein extends from the upper end 10 of the cylindrical vessel 1. In addition, a connecting line 18 having a shut-off valve 19 connected therein extends from the lower end 9 of the cylindrical vessel 1 to the water connector 8. Although not specifically shown in the drawing, it is noted that the electromagnet coil 3 is selectively connectable to a direct current source or an alternating current source.

During normal operation of the electromagnetic filter of the invention, a continuous or direct current flows through the coil 3 and magnetizes the balls 2 within the cylindrical vessel 1. Water travels from the water connector 8 through the inlet valve 7 and the tubes 6 to the open passages or openings 5 in the middle of the charge of the balls 2. Through the openings 5 in the branch tubes located in the middle horizontal plane of the ball charge 2, part of the water flows to the upper end 10 and part to the lower end 9 of the cylindrical vessel 1, as viewed in the FIGURE. Magnetic impurities contained in the water remain suspended on or adhering to the magnetized balls of the charge 2 thereof, and thus purified water flows through the lines 11 and 12 and through the outlet valve 13 to the water connector 14.

The considerably improved flow-through rate or output for such an electromagnetic filter according to the invention results from the division of the flow of water into two partial flows thereof, and the opportunity of selecting a considerably larger diameter for the cylindrical vessel 1 than conventionally, because the level of the charge of balls 2 lies markedly above that for an electromagnetic filter which is traversed by the water in only one direction.

To switch over the electromagnetic filter of the invention to rinsing operation, the shut-off valve 15, the inlet valve 7 and the outlet valve 13 are closed, and the shut-off valves 17 and 19 are opened. The water then flows through the connecting line 18 to the lower end 9 and through the charge of balls 2 to the upper end 10 of the cylindrical vessel 1, and leaves the latter through the rinsing medium discharge line 16. The rinsing water flow velocity must be selected as before so that the balls of the charge 2 thereof are being whirled upwardly, the duration of the rinsing process being not markedly increased, however, notwithstanding the greater level or height of the charge of balls 2, while direct current is again applied to the coil 3 during the rinsing of the electromagnetic filter of the invention and thereby the remainder of the impurities, that has not yet been rinsed out, again adheres to the balls 2. In this case, clean rinsing water is again very rapidly received in the rinsing water discharge line 16, and the system can again be transferred to filter operation by switching over the valves. With respect to flow-through quantity or rate, a considerably smaller quantity of rinsing water is thereby required than for a filter having a single flow-through direction. This fact permits branching off of the rinsing medium from the water connector 8 to the supply of the water when the water flow is not supposed to be interrupted. In this case, it is necessary to connect or open the shut-off valve 15, as shown in the illustrated embodiment, between the upper end 10 of the cylindrical vessel 1 and the water connector 14. Furthermore, in this case, the outlet valve 13 is not closed entirely so that a part of the water that flows through the connecting line 18 is employed for rinsing the electromagnetic filter of the invention, and another part of the water is used for maintaining the water flow between the water connectors 8 and 14.

If an interruption in the flow of water may occur i.e. there is no objection to interrupted water flow, the connecting line 18 can be dispensed with. It is also possible, then, to use the water connector 14 for supplying the contaminated water and the water connector 8 for discharging the cleaned water, without any by-pass line. A separate rinsing medium supply line is then unnecessary since the line 11, which then serves besides for feeding the water, takes over this function of supplying rinsing medium when the shut-off valve 15 is closed.

If one were, however, to use the water connector 8 for supplying the water, and to dispose the screen floor 4 for the charge of magnetizable balls 2 closely above the lower end 9 of the cylindrical vessel 1, the result thereof, for example, if there is a failure of the current supply to the electromagnetic coil 3, would be that no water which is soiled due to the dissolving impurities would enter the circulatory loop of the water, because the time period required for the water to flow through the space between the end of the charge of balls 2 and the end of the cylindrical vessel would be enough to interrupt the flow of water through the electromagnetic filter.

It is claimed:
1. Electromagnetic filter for impure water comprising an elongated substantially vertically disposed vessel traversible by impure water that is to be purified, a screen floor above the lower end of said vessel, a charge of magnetizable ball-like pellets received in said vessel and being carried by said screen floor, electric coil means coaxially surrounding said vessel, said coil means being electrically energizable to produce a magnetic field, rinsing water supply means connected to said substantially vertically disposed vessel at the lower end thereof, rinsing water discharge means connected to said vessel only at the upper end thereof to cause said rinsing water to flow upwardly through the entire charge of magnetizable ball-like pellets, passage means having a multiplicity of openings distributed over the cross section of said vessel in a plane disposed transversely to the axis of said vessel at substantially the middle of said charge of ball-like pellets, a pair of water connector means for respectively supplying water to the openings in said passage means and for discharging water from said vessel, means connecting said openings of said passage means to one of said water connector means, and respective lines extending from said ends of said vessel to the other of said water connector means, a shut-off valve being connected in one of said lines, said vessel being formed with substantially cylindrically shaped and similar air spaces below said screen floor and above said pellets, substantially horizontal portions of said charge of pellets at least partly defining said air spaces.

2. Electromagnetic filter according to claim 1 wherein said one line wherein said shut-off valve is connected extends from the upper end of said vessel, said shut-off valve being located in said one line between said other water connector means and a location at which said rinsing water discharge means branches from said one line, and including a closable connecting line extending from the lower end of said vessel to said one water connector means.

3. Electromagnetic filter according to claim 1 wherein said other water connector means that is connected by the respective lines to both ends of said vessel is connectible to a source of water to be supplied to said vessel, said one of said lines extending from the upper end of said vessel, said shut-off valve connected in said one of said lines being closable, when switching the electromagnetic filter from filter operation to rinsing operation, so that said other of said lines, connecting with the lower end of said vessel serves to conduct to said vessel rinsing medium suppliable through said other water connector means.

4. A method of removing magnetic impurities from water containing the same and separately discharging said magnetic impurities which comprises maintaining two sections of magnetizable ball-like pellets in a vessel, with one section of pellets above the other section of pellets and a passageway between said sections, said passageway having a multiplicity of openings to permit the flow of liquid into said sections of pellets, introducing said water containing said magnetic impurities into said passageway, passing a portion of said water containing magnetic impurities upwardly through said upper section of magnetizable pellets, passing another portion of said water containing magnetic impurities downwardly through said lower section of magnetizable pellets, producing a magnetic field by electrically energizing an electric coil coaxially surrounding said vessel to cause said magnetic impurities contained in the water to remain on said magnetized pellets, discharging water freed of magnetic impurities as a supply of water for further use, from the top of said upper section of pellets out through the top of said vessel and from the bottom of said lower section out through the bottom of said vessel, and periodically removing accumulated magnetic impurities retained in said vessel by interrupting the flow of said water containing magnetic impurities to said passageway, interrupting said magnetic field, introducing rinsing water at the lower end of said vessel passing said rinsing water upwardly first through said lower and then through said upper sections of pellets, and discharging said rinsing water carrying magnetic impurities from said sections of pellets from the upper end of said vessel.

5. A method according to claim 4 wherein during said periodic removal of accumulated magnetic impurities a portion of said flow of water containing magnetic impurities is employed as said rinsing water, and another portion of said flow of water is directed to said supply of water to assure uninterrupted supply of water.

* * * * *